United States Patent [19]
Fälker

[11] Patent Number: 5,894,558
[45] Date of Patent: Apr. 13, 1999

[54] METHOD OF DISPATCHING DOCUMENTS BY CONVERTING THE DOCUMENTS FROM A CUSTOMER SPECIFIC DATA FORMAT TO A STANDARDIZED DATA FORMAT, AND THEN TRANSMITTING THE DOCUMENTS VIA MOST FAVORABLE WAY TO RECIPIENTS

[75] Inventor: Gerrit Fälker, Korntal, Germany

[73] Assignee: Alcatel N.V., Netherlands, NLX

[21] Appl. No.: 08/682,673

[22] PCT Filed: Jan. 25, 1995

[86] PCT No.: PCT/EP95/00257

§ 371 Date: Oct. 25, 1996

§ 102(e) Date: Oct. 25, 1996

[87] PCT Pub. No.: WO95/21418

PCT Pub. Date: Aug. 10, 1995

[30] Foreign Application Priority Data

Feb. 5, 1994 [DE] Germany ............... 44 03 626

[51] Int. Cl.$^6$ ................................. G06F 13/00
[52] U.S. Cl. ............ 395/200.69; 395/500; 370/407
[58] Field of Search ................... 395/200.3–200.47, 395/500, 821, 109, 200.68–200.77; 370/407

[56] References Cited

U.S. PATENT DOCUMENTS

| | | | |
|---|---|---|---|
| 4,207,598 | 6/1980 | Reich et al. | 379/100.09 |
| 4,648,061 | 3/1987 | Foster | 395/200.58 |
| 4,677,611 | 6/1987 | Yanosy, Jr. et al. | 370/401 |
| 4,754,428 | 6/1988 | Schultz et al. | 385/200.76 |
| 5,239,577 | 8/1993 | Bates et al. | 379/701 |
| 5,265,033 | 11/1993 | Vajk et al. | 395/200.36 |
| 5,283,887 | 2/1994 | Zachery | 395/500 |
| 5,381,527 | 1/1995 | Inniss et al. | 395/200.69 |
| 5,406,557 | 4/1995 | Baudoin | 370/407 |
| 5,550,816 | 8/1996 | Hardwick et al. | 370/397 |
| 5,557,780 | 9/1996 | Edwards et al. | 395/500 |

FOREIGN PATENT DOCUMENTS

| | | |
|---|---|---|
| 0462725 | 12/1991 | European Pat. Off. . |
| 0544608 | 6/1993 | European Pat. Off. . |
| 0615368 | 9/1994 | European Pat. Off. . |
| 9101608 | 2/1991 | WIPO . |

OTHER PUBLICATIONS

Patent Abstracts of Japan, vol. 015 No. 326 (E–1102) Aug. 20, 1991 & JP A.03 123240 (NEC Corp.) May 27, 1991.
Patent Abstracts of Japan, vol. 014, No. 133 (E–0902) Mar. 13, 1990 & JP A.02 001659 (NEC Corp) Jan. 5, 1990.
Edifakt will simplify electronic business communications by Herbert C. Thomas, pp. 16 and 17 of the magazine "Computer week", Jun. 18, 1987.

*Primary Examiner*—Thomas C. Lee
*Assistant Examiner*—Harold J. Kim
*Attorney, Agent, or Firm*—Ware, Fressola, Van Der Sluys & Adolphson LLP

[57] ABSTRACT

A method of dispatching documents, wherein the basic idea is to first convert the documents from a customer-specific data format to a standardization data format, and only then to decide by means of a decision logic using the document in the standardized data format, whether the document is further transmitted to the recipient as an electronic document, or whether it is converted from the standardized to a postal data format in a converter station. The converter station then dispatches the document to a postal service printing center in the area where the recipient is located. There the document is printed out and directed for delivery by postal service personnel.

11 Claims, 3 Drawing Sheets

METHOD OF DISPATCHING DOCUMENTS BY CONVERTING THE DOCUMENTS FROM A CUSTOMER SPECIFIC DATA FORMAT TO A STANDARDIZED DATA FORMAT, AND THEN TRANSMITTING THE DOCUMENTS VIA MOST FAVORABLE WAY TO RECIPIENTS

TECHNICAL FIELD

The invention concerns a method of dispatching documents wherein the document to be dispatched is converted from a first data format to a second data format.

BACKGROUND OF THE INVENTION

The invention starts with a system for interchanging business documents via communication networks, as described in the article "Edifakt will simplify electronic business communications" by Herbert C. Thomas, on pages 16 and 17 of the magazine "Computerwoche" (computer week) of Jun. 28, 1987.

With this system it is possible to interchange documents between different enterprises via electronic means. Such documents are e.g. invoices, orders or shipping memos. The interchange of such documents uses a worldwide standardized data format called Edifakt (Electronic Data Interchange for Administration, Commerce and Transport). This data format specifies e.g. how the syntax of a document must look or which data elements must be included for different business occasions.

It furthermore provides a number of standard messages that serve as the basis for the interchange of data for internationally structured business occasions.

The documents which correspond to the Edifakt data format are interchanged between enterprises by using an application protocol on layer 7 of the OSI reference model. This renders the transmission of data independent of the lower communication layers and thereby independent of the lower hardware and software being used. However, before documents can be transmitted, they must be converted from the data format in which they were created by the respective enterprise (in-house data format or customer-specific data format) to the Edifakt data format. This is necessary because the auxiliary means used to create documents, e.g. text processing programs, do not use the Edifakt data format as a rule. A large number of such customer-specific data formats exists.

This system for the electronic interchange of business documents has the disadvantage that both the sender as well as the recipient must have the necessary facilities for sending or receiving Edifakt documents. Since small enterprises in particular, and above all private persons, will not have such systems available within a foreseeable time, a large part of the business documents or the business mail must as before be printed in letter form and brought to the postal service, which then takes over the further delivery.

In addition electronic mail service facilities are known, such as described e.g. in patent DE 24 32 398.6. With such a facility it is possible to dispatch a letter to a postal recipient, where the letter travels part of the way as an electronic letter, i.e. in the form of a data block which is transmitted via a communication network.

SUMMARY OF THE INVENTION

The invention now has the task of dispatching documents via a communication network to a number of differently equipped recipients. The task is fulfilled by a method of dispatching documents, comprising the steps of converting a document to be dispatched to a recipient from a first data format to a second data format at a customer station, with the second data format corresponding to a first application protocol, characterized in that following the conversion to the second data format, a decision is made in a decision logic as to whether or not the document in the second data format is transmissible to the recipient using the first application protocol, that if transmissible, the converted document is transmitted to a customer station of the recipient using the first application protocol, and that otherwise, a converter station converts the converted document to a third, postal data format and then transmits it to a postal output station, which prints it. It is also fulfilled by customer stations for dispatching documents to a recipient, comprising a memory device for documents, a converting device for converting the data format of a document stored in the memory device from a first to a second data format, an interface for transmitting documents using a protocol for data communication via long-range communication networks, and a controller for controlling the transmission of the documents, characterized in that the controller is designed to transmit the documents to the same converter station independently of the recipient. It is further fulfilled by a converter station for dispatching documents, characterized in that the converter station is equipped with a first, a second and a third communication device, with a converting device and with a decision logic, that the first communication device is able to receive a document corresponding to a first data format by using a protocol for the data communication via long-range communication networks, that the second communication device is able to transmit documents by using a first application protocol to which the first data format corresponds, that the third communication device is able to dispatch documents corresponding to a second data format to several postal output stations, that the converting device is able to convert documents from the first data format to the second data format, and that the decision logic is designed so that it decides for each incoming document whether or not the document can be transmitted to its recipient by using the first application protocol.

The basic idea of the invention for dispatching documents is to first convert the documents from a customer-specific data format to a standardized data format, and only then to decide by means of a decision logic using the document in the standardized data format, whether the document is further transmitted to the recipient as an electronic document, or whether it is converted from the standardized to a postal data format in a converter station. The converter station then dispatches the document to a postal service printing center in the area where the recipient is located. There the document is printed out and directed for delivery by postal service personnel.

The method of the invention has the advantage that a document is dispatched to its recipient via the most favorable way possible. The sender is no longer required to consider the type of dispatch in individual cases. This decision is automatically arrived at by a decision logic.

The invention furthermore carries out the conversion between the different data formats in a particularly advantageous manner. The conversion of the different customer-specific data formats to the standardized data format is performed by the customer himself; albeit this has the disadvantage that a document must be converted twice in the case of a postal dispatch. Since all the documents are first converted from the respective customer-specific data format to the standardized data format, the conversion to the postal data format is made possible in a central facility, which is then utilized to particular advantage. In this way it is furthermore not necessary to develop a conversion unit which converts each of the customer-specific data formats to the actually very special postal data format Another advantage of the invention is that the construction of the customer station is very simple. Nor are any further connections to the network required, through which the postal printing centers can be reached.

BRIEF DESCRIPTION OF THE DRAWINGS

The invention is explained further in the following by means of two configuration examples with the aid of the attached drawings, where.

BEST MODE FOR CARRYING OUT THE INVENTION

The first example explains the application of the method of the invention in a system for dispatching documents, which is equipped with several customer stations according to the invention, and with a converter station according to the invention.

Figure 1:
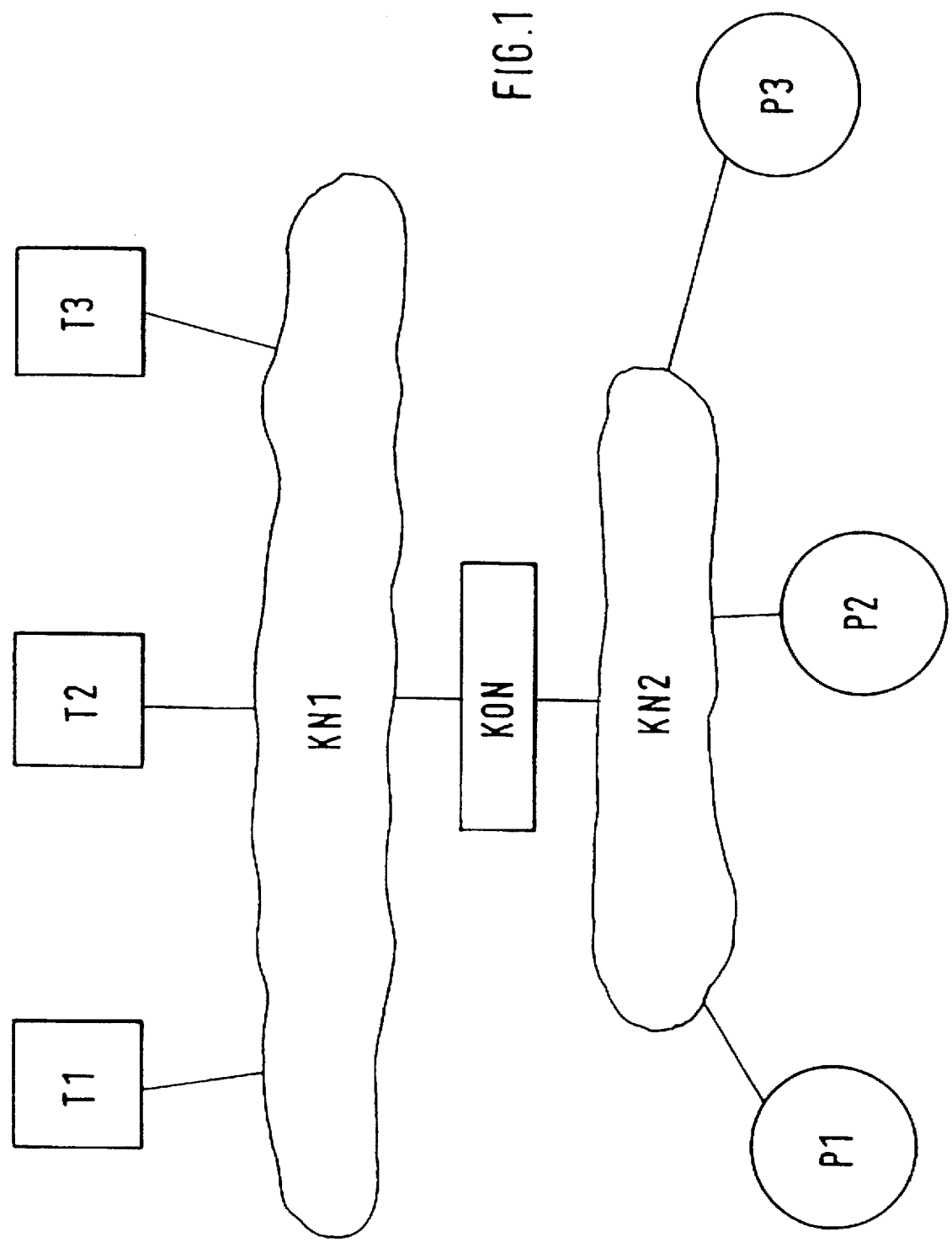
FIG. 1 is a symbolic representation of a system for dispatching documents, with several customer stations according to the invention, and with a converter station according to the invention for a first and a second configuration example.

FIG. 1 illustrates three customer stations T1 to T3, two long-range communication networks KN1 and KN2, a converter station KON and three postal output stations P1 to P3. The customer stations T1 to T3 are connected to the converter station KON via the long-range communication network KN1, and the converter station KON is connected to the postal output stations P1 to P3 via the long-range communication network KN2.

The customer stations T1 to T3 comprise a computer with the corresponding peripheral components, which make it possible to input a document, convert it from a first data format to a second data format, and to dispatch it in this format to the converter station KON via the long-range communication network KN1.

The converter station KON receives documents from the customer stations T1 to T3 via the long-range communication network KN1. For each incoming document it decides whether to dispatch it to its recipient via the long-range communication network KN1, or whether to convert it to a third postal data format and subsequently transmit it to one of the postal output stations P1 to P3 via the long-range communication network KN2.

The postal output stations P1 to P3 are postal service printing centers. In this instance the postal service concept represents the function of delivering letters and thus comprises all offerers of this function. The concept must also be understood in the postal way. The incoming documents are received in each of the postal output stations P1 to P3, where they are printed in the form of a letter and placed in an envelope. Subsequently said documents are directed in letter form to the normal delivery system of the postal service. In order for one of the postal output stations P1 to P3 to receive a document, it must be submitted in the third postal data format. It is an advantage to assign the postal output stations P1 to P3 to the mail delivery offices of the postal service.

The long-range communication network KN1 must be viewed as a virtual communication network on layer 7 of the ISO reference model. This layer is also called the application layer. The application protocol used in this long-range communication network is EDI. The data format Edifakt corresponds to this application protocol.

It is also possible to use a different long-range communication network for the long-range communication network KN1. Such a communication network could e.g. be an electronic mail system, which uses an application protocol according to the CCITT standard X.400.

The communication network KN2 is a data or telephone network. The data from the converter station KON are transmitted in correspondingly coded form via this communication network by using a suitable communication protocol. However, it is also possible to use the same type of long-range communication networks as for the long-range communication network KN1.

This is how a document is input into one of the customer stations T1 to T3. If it is to be dispatched, it is converted from the first data format to the second data format and transmitted to the converter station KON via the long-range communication network KN1. The decision is then made there whether the document is to be transmitted in the second data format to the recipient's customer station via the long-range communication network KN1, or whether it should be converted from the second data format to the third data format and subsequently transmitted to one of the postal output stations P1 to P3 via the long-range communication network KN2.

The exact sequence will now be explained by means of the example of dispatching a document from the customer station T1 to the customer station T2, and the example of dispatching a letter from the customer station T1 to a postal recipient who is serviced by the postal facility P1.

Figure 2:
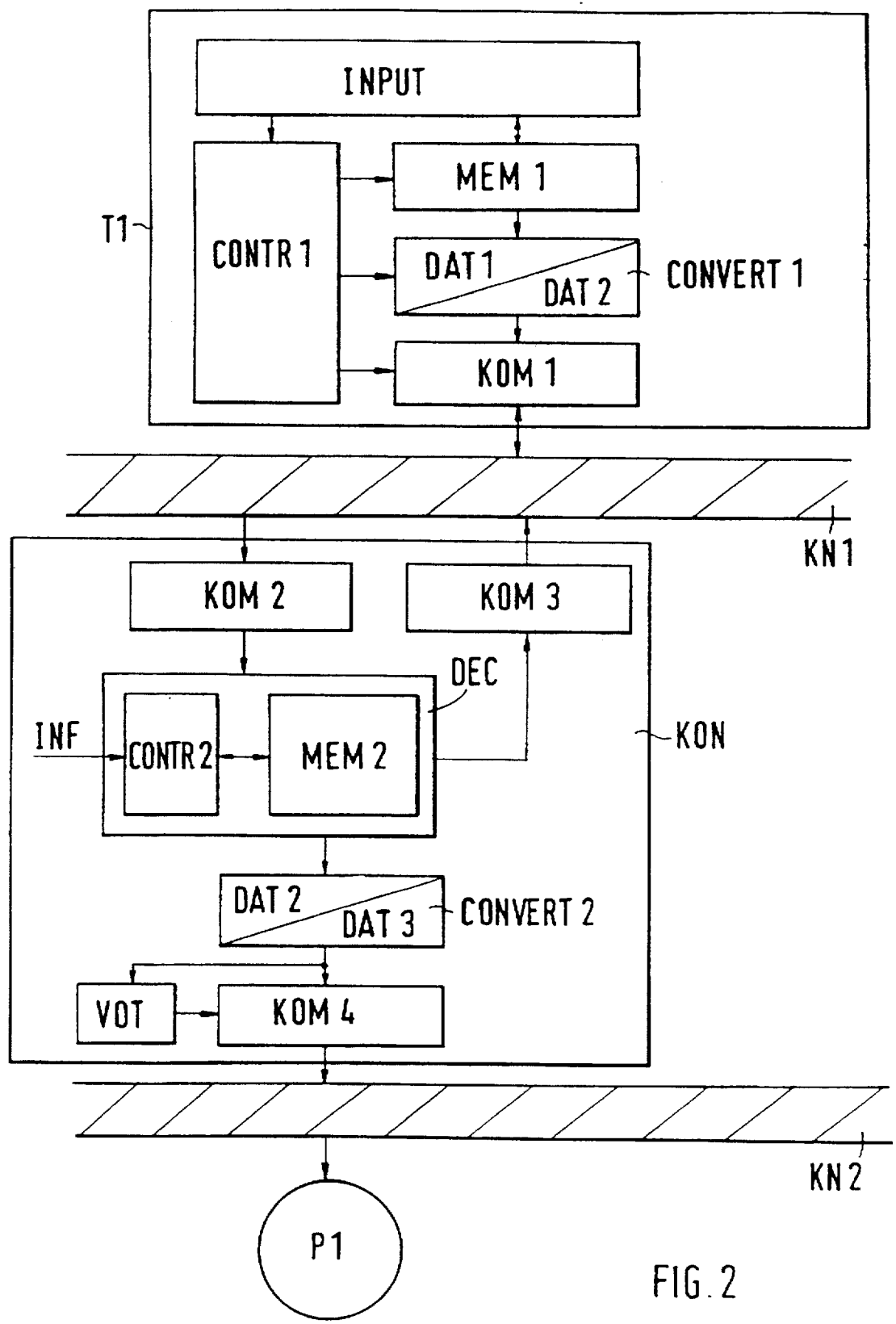
FIG. 2 is a block diagram of a section of the system in FIG. 1 for the first configuration example.

FIG. 2 illustrates the customer station T1, the converter station KON, the postal output station P1 and the long-range communication networks KN1 and KN2. The customer station T1 and the converter station KON interchange data via the long-range communication network KN1. The converter station KON transmits data to the long-range communication network KN2 and the postal output station P1 receives data from it.

The customer station T1 comprises an input device INPUT, a controller CONTR1, a memory device MEM1, a converting device CONVERT1 and a communication device KOM1. The memory device MEM1, the converting device CONVERT1 and the communication device KOM1 receive control commands from the controller CONTR1. The memory device MEM1 transmits documents to the converting device CONVERT1, and the latter to the communication device KOM1. This device interchanges data via the long-range communication network KN1.

The input device INPUT is formed by an EDV method. Such a system can create, store and display documents. Control commands are issued by the EDV method, which are directed to the controller CONTR1 and cause a document to be dispatched.

It is also possible for the input device INPUT to have other functions as well. Such functions could e.g. be auxiliary functions for developing tables or creating electronic forms. It is also possible for the input device INPUT to only read-in documents.

The documents processed by the input device INPUT are temporarily stored in the memory device MEM1. A document is retrieved from the memory device MEM1 if it needs to be dispatched. All the documents stored in the memory device MEM1 correspond to one data format DAT1, which is a customer-specific data format. It is a function of the EDV method used as the input device INPUT.

The converting device CONVERT1 converts the data format of documents from the data format DAT1 to a data format DAT2. Data format DAT2 is the Edifakt data format. This data format is provided for the electronic development of business transactions, e.g. invoices, orders or shipping memos.

It is also possible to use a different data format for data format DAT2. For example, a data format for electronic mail services according to the CCITT standard X.400 can also be used.

The communication device KOM1 makes it possible to dispatch documents by using an application protocol which corresponds to the data format DAT2. This application protocol is EDI. For the possibility of using a different second data format, a different application protocol which corresponds to the latter must be used.

The controller CONTR1 controls the dispatching of documents. In this way a document is created by means of the EDV method of input device INPUT and is temporarily stored in the memory device MEM1. If a control command for dispatching the document is issued by the input device INPUT to the controller CONTR1, it causes the document to be retrieved from the memory device MEM1, the document to be directed to converting device CONVERT1, said document to be converted to the second data format DAT2 in converting device CONVERT1, and the thus converted document to be dispatched by the communication device KOM1. The communication device KOM1 is controlled in such a way, that it always transmits the document to the converter station KON, irrespective of the recipient.

The converter station KON comprises three communication devices KOM2, KOM3 and KOM4, a decision logic DEC, a converting device CONVERT2 and a destination device VOT.

The communication device KOM2 receives data via the long-range communication network KN1 and the communication device KOM3 transmits data via the latter. The decision logic DEC receives documents from the communication device KOM2 and transmits documents to the communication device KOM3 and to the converting device CONVERT2. In addition, it receives the data INF. The converting device CONVERT2 transmits documents to the destination device VOT and to the communication device KOM4. The communication device KOM4 receives control commands from the destination device VOT and transmits data via the long-range communication network KN2.

The communication devices KOM2 and KOM3 are constructed like the communication devices KOM1, with the difference that the communication device KOM2 is only designed to receive, and the communication device KOM3 is only designed to transmit documents via the long-range communication network KN1.

The converting device CONVERT2 converts the data format of documents from the data format DAT2 to a data format DAT3. The data format DAT3 is a postal data format. The postal output stations P1 to P3 are only able to evaluate documents in this data format. Such a data format is e.g. e-mail, which is used by the German Federal Postal Service.

The communication device KOM4 is used to dispatch documents to one of the postal output stations P1 to P3 via the long-range communication network KN2.

From a document in data format DAT3 which is to be dispatched, the destination device VOT determines the destination address of those postal output stations of the delivery area in which the postal recipient, to whom said document is addressed, is located.

The destination device VOT could also be omitted. In that case the corresponding services must be available in the long-range communication network KN2.

The decision logic DEC makes the decision whether a document is to be dispatched to the recipient via the long-range communication network KN1 or via the postal way. It comprises a controller CONTR2 and a memory device MEM2, which interchange data.

The memory device MEM2 stores data about which of the customer stations T1 to T3 is able, or is authorized, to communicate with each other by using the application protocol EDI. Beyond that, other data about the customer stations T1 to T3 can also be stored in the memory device MEM2, such as e.g. those concerning the communications that can use application protocols or operating means. Data about the long-range communication network KN1 can also be stored in the memory device MEM2.

From a document arriving in data format DAT2 at the decision logic DEC, the controller CONTR2 determines the address of the sender and the recipient. It then makes a decision by means of these data and the data stored in the memory device MEM2. In addition, the controller CONTR2 can use other data for this decision, which are made available by the data INF. The data INF can e.g. be input into the converter station KON via an input device, or they can be transmitted from one of the customer stations T1 to T3 to the converter station KON via the long-range communication network KN1.

The data INF could also be data about the status of long-range communication network KN1 or of other operating means. It may also be advantageous to store part of the data INF in the memory device MEM2. This could be used e.g. for the constant updating of predetermined environmental data.

Data which influence the decision of the controller CONTR2 could also be entered directly by the customer station T1 into the document arriving at the decision logic DEC.

The decision logic DEC can also decide between more than two alternatives. For example, a third alternative could be that the document is converted to a further data format by a further converter device, and is transmitted to the recipient by a third long-range communication network using an application protocol which corresponds to this data format. Such a third long-range communication network could e.g. be an electronic postal system according to the industry standard X.400. In this way, in addition to the dispatching via EDI and the postal delivery, it would also be possible to transmit a document to the recipient via an electronic mail system.

Using an application protocol, the customer station T1 now transmits a document via the long-range communication network KN1 to the converter station KON. The latter receives it in communication device KOM2 and redirects it to the decision logic DEC. The latter determines the sender and recipient from the document and then determines the potential communication relationships between these partners. If a communication between them is possible via the long-range communication network KN1 using the application protocol EDI, and was also agreed, it redirects the document to the communication device KOM3. Otherwise it is redirected to the converting device CONVERT2.

The communication device KOM3 then determines the recipient, customer station T3 in our example, from the document and transmits the document to said customer station T3 via the long-range communication network KN1 using the application protocol EDI.

The converting device CONVERT2 converts the data format of the document to the postal data format DAT3 and redirects it to the communication device KOM4, which then transmits the document to the postal output station P1 via the long-range communication network KN2 by using the control commands of the destination device VOT.

It is also possible to use two long-range communication networks instead of long-range communication network KN1. In that case, the communication device KOM1 would not use the application protocol EDI to transmit a document to the communication device KOM2, but rather another protocol for transparently transmitting data via long-range communication networks. Such a protocol could be e.g. a protocol for a proprietary file transfer system, but also for an electronic mail system (mail enabled process). These two long-range communication networks could therefore also be the networks of two different service offerers, where the first service offerer would e.g. offer the file transfer service and the second service offerer would offer the EDI service.

The second configuration example explains the application of the method of the invention to a document dispatching system with several customer stations according to the invention, and with a converter station.

The structure of the system is the same as that of the system in the first configuration example, namely according to FIG. 1. It differs from the first configuration example however in that the decision logic is always located in the respective customer stations.

The operating mode will now be explained in more detail by means of FIG. 3. The references of the different devices are the same as in the example of FIG. 2. If there is a difference in the operating mode, a ' is added to the reference of FIG. 2. The operating mode is briefly addressed only in that instance.

Figure 3:
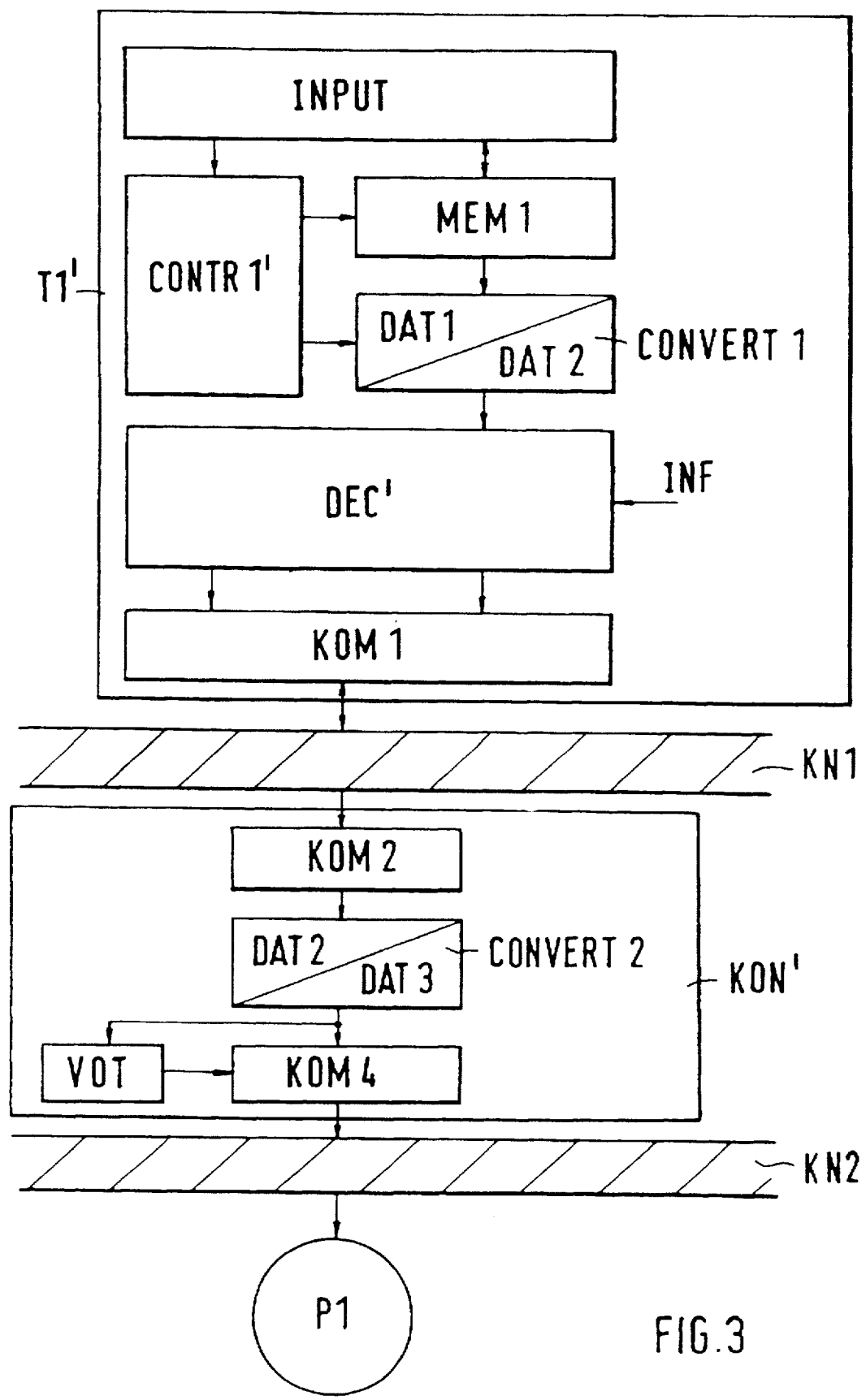
FIG. 3 is a block diagram of a section of the system in FIG. 1 for the second configuration example.

FIG. 3 illustrates a customer station T1', a converter station KON', the postal output station P1 and the long-range communication networks KN1 and KN2. The customer station T1' and the converter station KON' interchange data via the long-range communication network KN1. The converter station KON' transmits data and the postal output station P1 receives data via the long-range communication network KN2.

In contrast to the customer station T1 and the converter station KON, in this instance the customer station T1' contains a decision logic and the converter station KON' contains no decision logic.

The customer station T1' comprises the input device INPUT, the memory device MEM1, the converting device CONVERT1, a decision logic DEC', a controller CONTR1' and the communication device KOM1.

The input device INPUT interchanges data with the memory device MEM1 and transmits control commands to the controller CONTR1'. The memory device MEM1 and the converting device CONVERT1 receive control commands from the controller CONTR1'. The memory device MEM1 transmits documents to the converting device CONVERT1 and the latter to the decision logic DEC'. The decision logic DEC' transmits documents and control commands to the communication device KOM1. The latter interchanges data via the long-range communication network KN1.

In contrast to decision logic DEC, with decision logic DEC' it is not necessary to retrieve the sender's address from the document, since only documents from customer station T1' arrive at the decision logic DEC'. Unlike the controller CONTR1 of communication device KOM1, controller CONTR1' does not issue control commands regarding the destination of a document.

The converter station KON' comprises both communication devices KOM2 and KOM4, the converting device CONVERT2 and the destination device VOT. The communication device KOM2 receives data via the long-range communication network KN1 and transmits documents to converting device CONVERT2. The converting device CONVERT2 transmits documents to the communication device KOM4 and to the destination device VOT, which transmits control commands to communication device KOM4. The communication device KOM4 transmits data via the long-range communication network KN2.

A document is now created with the EDV method of the input device INPUT. To transmit a document, a control command is issued via input device INPUT to the controller CONTR1'. The latter then causes the document, which is temporarily stored in the first data format in memory device MEM1, to be directed further to the converting device CONVERT1. The latter then converts the data format of the document from data format DAT1 to data format DAT2. From the document in data format DAT2, the decision logic DEC' determines the recipient of the document and thereby and by means of the available data decides whether the document is dispatched to the recipient via the long-range communication network KN1, or whether it is delivered to him by the postal service. It directs the document to the communication device KOM1 and in the first instance causes it to transmit the document to the customer station of the recipient, and in the second instance to the converter station KON' via the long-range communication network KN1. The application protocol EDI for dispatching the document is used in both instances.

In the second instance the document is received by the communication device KOM2 of converter station KON'. Subsequently it is converted by converting device CONVERT2 from the data format DAT2 to data format DAT3. It is then redirected to the communication device KOM4 which transmits it via the long-range communication network KN2 to the postal output station P1, where it is printed out in letter form. After that it is directed to the recipient's postal delivery system.

It is also possible to use a different number of customer stations and postal output stations in both configuration examples. More than one converter station can also be used. In this way e.g., each of several converter stations could service a predetermined number of customer stations.

What is claimed is:

1. A method of dispatching documents, comprising the steps of converting a document to be dispatched to a recipient from a first data format (DAT1) to a second data format (DAT2) at a customer station (T1, T2, T3; T1') of the sender, with the second data format (DAT2) corresponding to a first application protocol, characterized in that following the conversion to the second data format (DAT2), a decision is made in a decision logic (DEC; DEC') as to whether or not the recipient is capable of interpreting the document if transmitted in the second data format (DAT2) using the first application protocol, that if the recipient is capable of interpreting the document if transmitted in the second data format using the first application protocol, the converted document is transmitted to a customer station (T1, T2, T3;

T1') of the recipient using the first application protocol, and that otherwise, a converter station (KON; KON') converts the converted document to a third, postal data format (DAT3) and then transmits it to a postal output station (P1, P2, P3), which prints it.

2. A method as claimed in claim 1, characterized in that if the decision logic (DEC') is contained in the customer station (T1') and determines that the converted document is not transmissible using the first application protocol, the customer station (T1') of the sender transmits the document to the converter station.

3. A method as claimed in claim 1, characterized in that if the decision logic (DEC) is contained in the converter station (KON), the converter station transmits the document to the customer station (T1, T2, T3) of the recipient or to the postal output station (P1, P2, P3).

4. A method as claimed in claim 3, characterized in that the document is transmitted from the customer station (T1, T2, T3; T1') of the sender to the converter station (KON; KON') using the first application protocol.

5. A method as claimed in claim 3, characterized in that the document is transmitted from the customer station (T1, T2, T3; T1') of the sender to the converter station (KON; KON') transparently using a further protocol.

6. A method as claimed in claim 1, characterized in that the first application protocol is a protocol for electronic business communication.

7. A method as claimed in claim 1, characterized in that the decision logic (DEC; DEC') has the alternative to decide for transmission using a second application protocol.

8. A method as claimed in claim 7, characterized in that the second application protocol is a protocol for electronic mail service.

9. A method as claimed in claim 1, characterized in that the decision logic (DEC; DEC') is fed with data, particularly with data about recipients, usable protocols, and suitable operating means.

10. A converter station (KON) for dispatching documents, characterized in that the converter station (KON) is equipped with a first, a second and a third communication device (KOM2/KOM3/KOM4), with a converting device (KONVERT2) and with a decision logic (DEC), that the first communication device (KOM2) is able to receive a document corresponding to a first data format (DAT2) by using a protocol for the data communication via long-range communication networks, that the second communication device (KOM3) is able to transmit documents by using a first application protocol to which the first data format (DAT2) corresponds, that the third communication device (KOM4) is able to dispatch documents corresponding to a second data format (DAT3) to several postal output stations (P1, P2, P3), that the converting device (KONVERT2) is able to convert documents from the first data format (DAT2) to the second data format (DAT3), and that the decision logic (DEC) is designed so that it decides for each incoming document whether or not its recipient is capable of interpreting the document if transmitted by using the first application protocol.

11. A customer station (T1') for dispatching documents to a recipient, with a memory device (MEM1) for documents, with a converting device (KONVERT1) for converting the data format of a document stored in the memory device from a first to a second data format (DAT1/DAT2), with a communication device (KOM1) for dispatching a document corresponding to the second data format (DAT2) by using a first application protocol to which the second data format (DAT2) corresponds, characterized in that the customer station (T1') is equipped with a decision logic (DEC), which is designed to decide by means of the document in the second data format (DAT2) whether or not the recipient is capable of interpreting the document if transmitted by using the first application protocol, and that in the affirmative case it causes the document to be dispatched to the recipient via the communication device (KOM1), and otherwise to a converter station (KON').

* * * * *

UNITED STATES PATENT AND TRADEMARK OFFICE
CERTIFICATE OF CORRECTION

PATENT NO. : 5,894,558
DATED : April 13, 1999
INVENTOR(S) : Gerrit Falker

It is certified that error appears in the above-identified patent and that said Letters Patent is hereby corrected as shown below:

In column 10, line 3 (Claim 10, line 5), "KONVERT2" should be --CONVERT2--.

In column 10, line 5 (Claim 10, line 15), "KONVERT2" should be --CONVERT2--.

In column 10, line 22 (Claim 11, line 3), "KONVERT1" should be --CONVERT1--.

Signed and Sealed this

Twenty-second Day of May, 2001

Attest:

NICHOLAS P. GODICI

Attesting Officer     Acting Director of the United States Patent and Trademark Office